United States Patent
Smith et al.

(10) Patent No.: US 12,030,519 B2
(45) Date of Patent: Jul. 9, 2024

(54) SYSTEM AND METHOD FOR OPERATING AND MANAGING AN AUTONOMOUS VEHICLE INTERCHANGE ZONE

(71) Applicant: Outrider Technologies, Inc., Brighton, CO (US)

(72) Inventors: Andrew F. Smith, Bend, OR (US); Joseph A. Welsh, Golden, CO (US); William N. Klarquist, Littleton, CO (US); Peter James, Denver, CO (US); Geoffrey W. Johnson, Golden, CO (US); Kayla M. Holcomb, Denver, CO (US); Lawrence S. Klein, Bend, OR (US); Jason L. Williams, Bloomingdale, IL (US); Floyd C. Henning, Arvada, CO (US); Jeremy M. Nett, Littleton, CO (US)

(73) Assignee: Outrider Technologies, Inc., Brighton, CO (US)

( * ) Notice: Subject to any disclaimer, the term of this patent is extended or adjusted under 35 U.S.C. 154(b) by 102 days.

(21) Appl. No.: 17/332,474

(22) Filed: May 27, 2021

(65) Prior Publication Data
US 2022/0017110 A1 Jan. 20, 2022

Related U.S. Application Data

(60) Provisional application No. 63/031,552, filed on May 28, 2020.

(51) Int. Cl.
*B60W 60/00* (2020.01)
*H04W 4/44* (2018.01)

(52) U.S. Cl.
CPC ............ *B60W 60/001* (2020.02); *H04W 4/44* (2018.02); *B60W 2300/12* (2013.01); *B60W 2300/14* (2013.01)

(58) Field of Classification Search
CPC .......... B60W 60/001; B60W 2300/12; B60W 2300/14; H04W 4/44; B65G 63/004; G07C 9/37; G07C 9/27; G07C 9/00111
(Continued)

(56) References Cited

U.S. PATENT DOCUMENTS

| 8,710,955 B2 | 4/2014 | Teti | |
| 2008/0166211 A1* | 7/2008 | Lanigan | B65G 63/004 |

(Continued)

FOREIGN PATENT DOCUMENTS

| JP | 2006264909 A | 10/2006 |
| WO | 2016205860 A1 | 12/2016 |

OTHER PUBLICATIONS

Mai-Ha Phan, Kap Hwan Kim, Negotiating truck arrival times among trucking companies and a container terminal, Transportation Research Part E: Logistics and Transportation Review, vol. 75, 2015, pp. 132-144, ISSN 1366-5545,https://doi.org/10.1016/j.tre.2015.01.004. (Year: 2015).*

(Continued)

*Primary Examiner* — Elaine Gort
*Assistant Examiner* — Ellis B. Ramirez
(74) *Attorney, Agent, or Firm* — Loginov & Associates, PLLC; William A. Loginov (57) ABSTRACT

This provides a system and method for handling the interchange of trailers between an over the road (OTR) truck and an autonomous vehicle (AV) yard truck in a facility yard includes an interchange zone (IZ) that is bounded by a predetermined boundary structure, having an OTR entry gate and an OTR exit gate on a first side and an AV entry gate and an AV exit gate on a second side. The system and method further includes a management process that selectively opens and closes each of the OTR entry gate, the OTR (Continued)

exit gate, the AV entry gate and the AV exit gate according to a predetermined set of rules.

18 Claims, 9 Drawing Sheets

(58) Field of Classification Search
USPC ...... 701/23, 117; 340/5.7, 5.71, 909; 726/13
See application file for complete search history.

(56) References Cited

U.S. PATENT DOCUMENTS

| | | | |
|---|---|---|---|
| 2011/0251716 A1* | 10/2011 | Buzzoni | ................ G06Q 10/06 |
| 2012/0146763 A1* | 6/2012 | Teti | ........................... G07C 9/37 |
| 2014/0086709 A1* | 3/2014 | Kasai | ................... B65G 63/004 |
| 2017/0267267 A1* | 9/2017 | Bollapragada | .......... B66C 13/48 |
| 2018/0295141 A1* | 10/2018 | Solotorevsky | ........ G06F 21/554 |
| 2019/0064835 A1* | 2/2019 | Hoofard | ................... B60T 7/22 |
| 2019/0302764 A1 | 10/2019 | Smith | |

OTHER PUBLICATIONS

International Search Report and Written Opinion for App. No. PCT/US2021/034951, dated Oct. 19, 2021, 9 pages.

* cited by examiner

SYSTEM AND METHOD FOR OPERATING AND MANAGING AN AUTONOMOUS VEHICLE INTERCHANGE ZONE

RELATED APPLICATION

This application claims the benefit of U.S. Patent Application Ser. No. 63/031,552, entitled SYSTEM AND METHOD FOR OPERATING AND MANAGING AN AUTONOMOUS VEHICLE INTERCHANGE ZONE, filed May 28, 2020, the teachings of which are incorporated herein by reference.

FIELD OF THE INVENTION

This invention relates to autonomous vehicles, and more particularly to systems and methods for controlling the movement and operation of such vehicles in a shipping yard or like facility.

BACKGROUND OF THE INVENTION

Trucks are an essential part of modern commerce. These trucks transport materials and finished goods across the continent within their large interior spaces. Such goods are loaded and unloaded at various facilities that can include manufacturers, ports, distributors, retailers, and end users. Large over-the road (OTR) trucks typically consist of a tractor or cab unit and a separate detachable trailer that is interconnected removably to the cab via a hitching system that consists of a so-called fifth wheel and a kingpin. More particularly, the trailer contains a kingpin along its bottom front and the cab contains a fifth wheel, consisting a pad and a receiving slot for the kingpin. When connected, the kingpin rides in the slot of the fifth wheel in a manner that allows axial pivoting of the trailer with respect to the cab as it traverses curves on the road. The cab provides power (through (e.g.) a generator, pneumatic pressure source, etc.) used to operate both itself and the attached trailer.

A wide range of solutions have been proposed over the years to automate one or more processes of a truck, thereby reducing or eliminating the input labor needed by a driver. In one application, trucks that are used to shunt trailers around a yard between storage/parking locations and loading/unloading docks. Such vehicles are generally termed "yard trucks" and can be powered by fossil fuels or electricity in various configurations. Various novel autonomous vehicle implementations and function associated with autonomous vehicle yard trucks (herein termed "AV yard trucks"), are described in commonly assigned U.S. patent application Ser. No. 16/282,258, entitled SYSTEMS AND METHODS FOR AUTOMATED OPERATION AND HANDLING OF AUTONOMOUS TRUCKS AND TRAILERS HAULED THEREBY, by Andrew F. Smith, et al., filed Feb. 21, 2018, and related applications thereto, the teachings of which are expressly incorporated herein by reference by way of useful background information.

The use of AV yard trucks can be challenging in that coordination between such AV yard trucks and OTR trucks, which deliver and/or depart from the yard with trailers, is often challenging. There may be elements of human intervention required in this effort, and there is risk of collisions between vehicles and/or significant harm to persons if the environment in which trailers are exchanged between types of trucks is not carefully controlled.

SUMMARY OF THE INVENTION

This invention overcomes the disadvantages of the prior art by providing a system and method for managing the handling of trailers in a yard environment in which AV yard trucks are employed, in which one or more Interchange Zones (IZs) are used to isolate and direct such handling relative to other activities within the yard. The system and method ensures efficient and safe interchange of trailers between OTRs and AV yard trucks.

In an illustrative embodiment, a system and method for handling the interchange of trailers between an over the road (OTR) truck and an autonomous vehicle (AV) yard truck in a facility yard includes an interchange zone (IZ) that is bounded by a predetermined boundary structure, having an OTR entry gate and an OTR exit gate on a first side and an AV entry gate and an AV exit gate on a second side. The system and method further includes a management process that selectively opens and closes each of the OTR entry gate, the OTR exit gate, the AV entry gate and the AV exit gate according to a predetermined set of rules. Illustratively, the management process is arranged to determine whether the IZ is free of vehicles as an initial assumption in performing an interchange procedure. The management process can be arranged to open the AV entry gate following the initial assumption and, after passage of the AV yard truck therethrough close to AV entry gate. After the passage of the AV yard truck and dropoff or pickup of a trailer thereby in the IZ, the management process can be further arranged to open the AV exit gate to allow passage of the AV yard truck therethrough. The management process can also be arranged to allow opening of at least one of the OTR entry gate and the OTR exit gate following the initial assumption and, after passage of the OTR truck therethrough allow closing to OTR entry gate. Illustratively, after the passage of the OTR truck and dropoff or pickup of a trailer thereby in the IZ, the management process is arranged to allow closing of the OTR exit gate after passage of the OTR truck therethrough. The OTR entry gate, the OTR exit gate, the AV entry gate and the AV exit gate can each include sensors that detect an open or closed state and report the state to the management process. Additionally, the management process can interact with a controller for the AV yard truck to direct movement with respect to the IZ. The boundary structure can be adapted to restrict vehicle entry into the IZ except via the OTR entry gate, the OTR exit gate, the AV entry gate and the AV exit gate. The AV yard truck and/or the OTR truck can include a tracking mechanism that interfaces with the management process to predict and manage arrival to and departure from the IZ. A standby zone is provided. It allows for waiting of the OTR trucks that are otherwise scheduled to enter the IZ, the standby zone located along a path of travel between an entrance of the facility and the IZ. The management process can include a GateComms process that communicates with the AV gate controllers and other peripherals associated with the facility using RF and wired communications links. The GateComms process can be arranged to facilitate standard and emergency procedures associated with the facility.

BRIEF DESCRIPTION OF THE DRAWINGS

The invention description below refers to the accompanying drawings, of which.

DETAILED DESCRIPTION

I. Operational Overview

Figure 1:
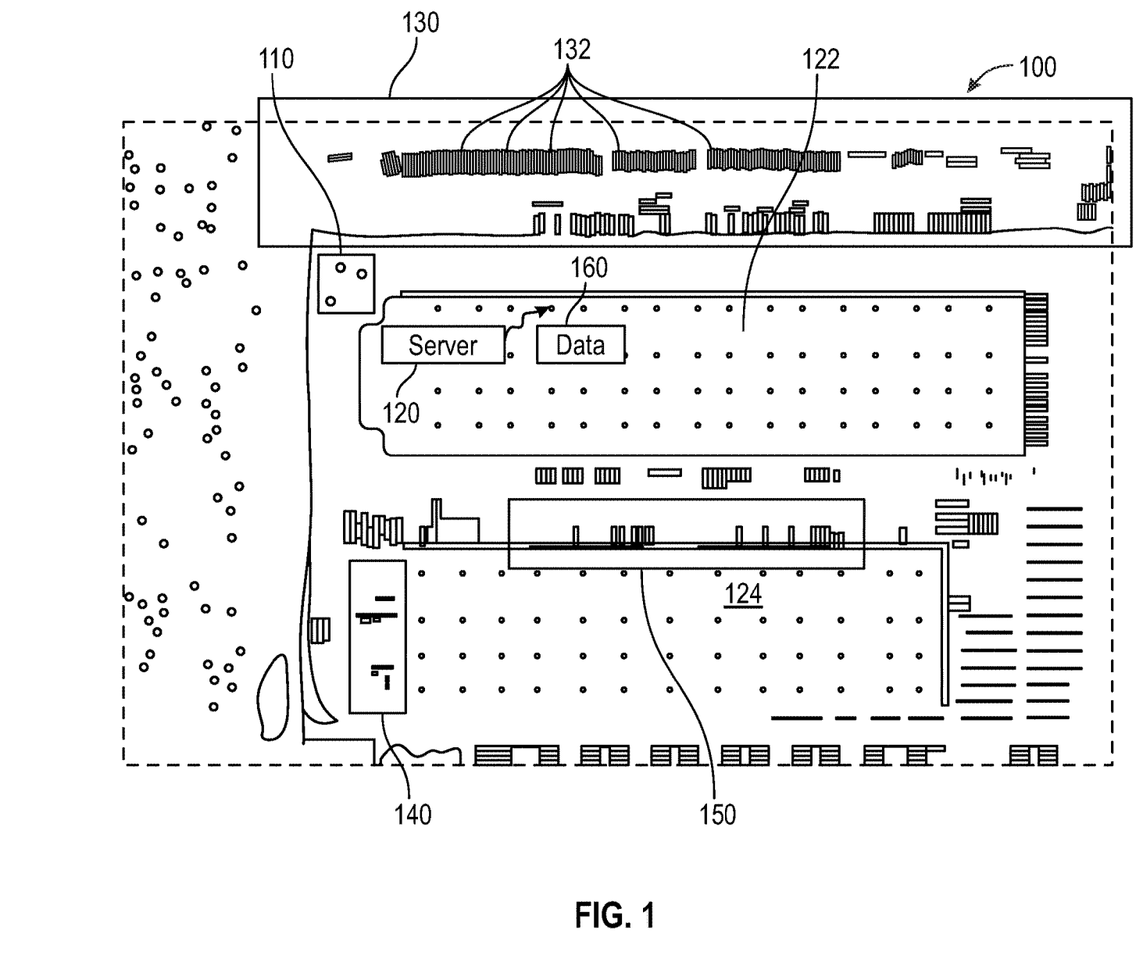
FIG. 1 is a diagram showing an aerial view of an exemplary shipping facility with locations for storing, loading and unloading trailers used in conjunction with the AV yard truck arrangements provided according to a system and method for handling trailers within a yard.

According to FIGS. 1-4, shown and described in the above-incorporated U.S. patent application Ser. No. 16/282,258, an example of an implementation of an AV yard facility is described by way of further background as to the operative principles used herein. Hence, FIG. 1 shows an aerial view of an exemplary conventional shipping facility 100, in which over-the-road (OTR) trucks (tractor trailers) deliver goods-laden trailers from remote locations and retrieve trailers for return to such locations (or elsewhere—such as a storage depot). In a standard operational procedure, the OTR transporter arrives with a trailer at a destination's guard shack (or similar facility entrance checkpoint) 110. The guard/attendant enters the trailer information (trailer number or QR (ID) code scan-imbedded information already in the system, which would typically include: trailer make/model/year/service connection location, etc.) into the facility software system, which is part of a server or other computing system 120, located offsite, or fully or partially within the facility building complex 122 and 124. The complex 122, 124 includes perimeter loading docks (located on one or more sides of the building), associated (typically elevated) cargo portals and doors, and floor storage, all arranged in a manner familiar to those of skill in shipping, logistics, and the like.

By way of a simplified operational example, after arrival of the OTR truck, the guard/attendant would then direct the driver to deliver the trailer to a specific numbered parking space in a designated staging area 130—shown herein as containing a large array of parked, side-by-side trailers 132, arranged as appropriate for the facility's overall layout. The trailer's data and parked status is generally updated in the company's integrated yard management system (YMS), which can reside on the server 120 or elsewhere.

Once the driver has dropped the trailer in the designated parking space of the staging area 130, he/she disconnects the service lines and ensures that connectors are in an accessible position (i.e. if adjustable/sealable). If the trailer is equipped with swing doors, this can also provide an opportunity for the driver to unlatch and clip trailer doors in the open position, if directed by yard personnel to do so.

At some later time, the (i.e. loaded) trailer in the staging area 130 is hitched to a yard truck/tractor, which, in the present application is arranged as an autonomous vehicle (AV). Thus, when the trailer is designated to be unloaded, the AV yard truck is dispatched to its marked parking space in order to retrieve the trailer. As the yard truck backs down to the trailer, it uses one or multiple mounted (e.g. a standard or custom, 2D grayscale or color-pixel, image sensor-based) cameras (and/or other associated (typically 3D/range-determining) sensors, such as GPS receiver(s), radar, LiDAR, stereo vision, time-of-flight cameras, ultrasonic/laser range finders, etc.) to assist in: (i) confirming the identity of the trailer through reading the trailer number or scanning a QR, bar, or other type of coded identifier; (ii) Aligning the truck's connectors with the corresponding trailer receptacles. Such connectors include, but are not limited to, the cab fifth (5th) wheel-to-trailer kingpin, pneumatic lines, and electrical leads. Optionally, during the pull-up and initial alignment period of the AV yard truck to the trailer, the cameras mounted on the yard truck can also be used to perform a trailer inspection, such as checking for damage, confirming tire inflation levels, and verifying other safety criteria.

The hitched trailer is hauled by the AV yard truck to an unloading area 140 of the facility 100. It is backed into a loading bay in this area, and the opened rear is brought into close proximity with the portal and cargo doors of the facility. Manual and automated techniques are then employed to offload the cargo from the trailer for placement within the facility 100. During unloading, the AV yard truck can remain hitched to the trailer or can be unhitched so the yard truck is available to perform other tasks. After unloading, the AV yard truck eventually removes the trailer from the unloading area 140 and either returns it to the staging area 130 or delivers it to a loading area 150 in the facility 100. The trailer, with rear swing (or other type of door(s)) open, is backed into a loading bay and loaded with goods from the facility 100 using manual and/or automated techniques. The AV yard truck can again hitch to, and haul, the loaded trailer back to the staging area 130 from the loading area 150 for eventual pickup by an OTR truck. Appropriate data tracking and management is undertaken at each step in the process using sensors on the AV yard truck and/or other manual or automated data collection devices—for example, terrestrial and/or aerial camera drones.

Having described a generalized technique for handling trailers within a facility reference is now made to FIGS. 2-4, which show exemplary yard trucks 200 and 300 for use with the various embodiments described hereinbelow. The yard truck 200 (FIG. 2) is powered by diesel or another internal combustion fuel, and the yard truck 300, 400 (FIGS. 3 and 4) electricity, using appropriate rechargeable battery assembly that can operate in a manner known to those of skill. For the purposes of this description, the AV yard truck is powered by rechargeable batteries, but it is contemplated that any other motive power source (or a combination thereof) can be used to provide mobility to the unit. Notably, the yard truck 200, 300, 400 of each example respectively includes at least a driver's cab section 210, 310, 410 (which can be omitted in a fully autonomous version) and steering wheel (along with other manual controls) 212, 312, 412 and a chassis 220, 320, 420 containing front steerable wheels 222, 422, and at least one pair of rear, driven wheels 224, 424 (shown herein as a double-wheel arrangement for greater load-bearing capacity). The respective chassis 220, 320, 420 also includes a so-called fifth (5th) wheel 240, 340, that (with particular reference to the truck 300, 400 in FIGS. 3 and 4) is arranged as a horseshoe-shaped pad 342, 442 with a rear-facing slot 344 (FIG. 3), which is sized and arranged to receive the kingpin hitch (shown and described further below) located at the bottom of a standard trailer (not shown). The fifth wheel 240, 340, 440 is shown tilted downwardly in a rearward direction so as to facilitate a ramping action when the truck is backed onto the trailer in FIG. 2.

Figure 4:
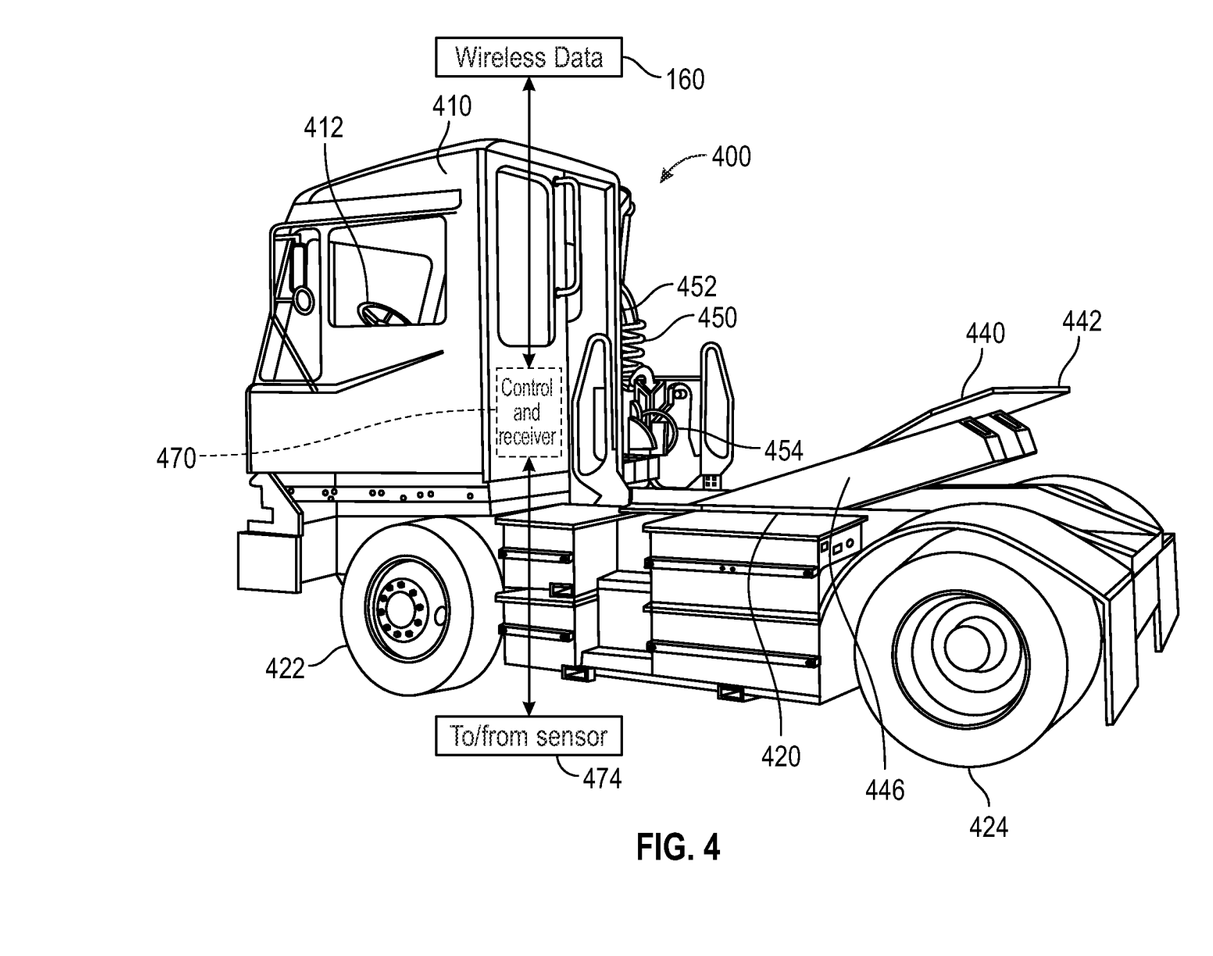
FIG. 4 is a rear-oriented perspective view of another example of an electrically powered AV yard truck, showing a truck chassis raised fifth wheel thereof.

In FIG. 4, the fifth wheel 440 is shown raised by a lever arm assembly 442, which as described below, allows the landing gear of the trailer (when attached) to clear the ground during hauling by the truck 400. The lever assembly 442 or other fifth wheel-lifting mechanisms can employ appropriate hydraulic lifting actuators/mechanisms known to those of skill so that the hitched trailer is raised at its front end. In this raised orientation, the hitch between the truck and trailer is secured.

The AV yard truck can include a variety of sensors as described generally above, that allow it to navigate through the yard and hitch-to/unhitch-from a trailer in an autonomous manner that is substantially or completely free of human intervention. Such lack of human intervention can be with the exception, possibly, of issuing an order to retrieve or unload a trailer—although such can also be provided by the YMS via the server 120 using a wireless data transmission 160 (FIG. 1) to and from the truck (which also includes an appropriate wireless network transceiver—e.g. WiFi-based, etc.). This system can be used as a standalone, or combination with other on-site and/or offsite computing resources (e.g. a cloud computing environment) to carry out the operation of the interchange zone system and method herein (described in detail below).

Figure 2:
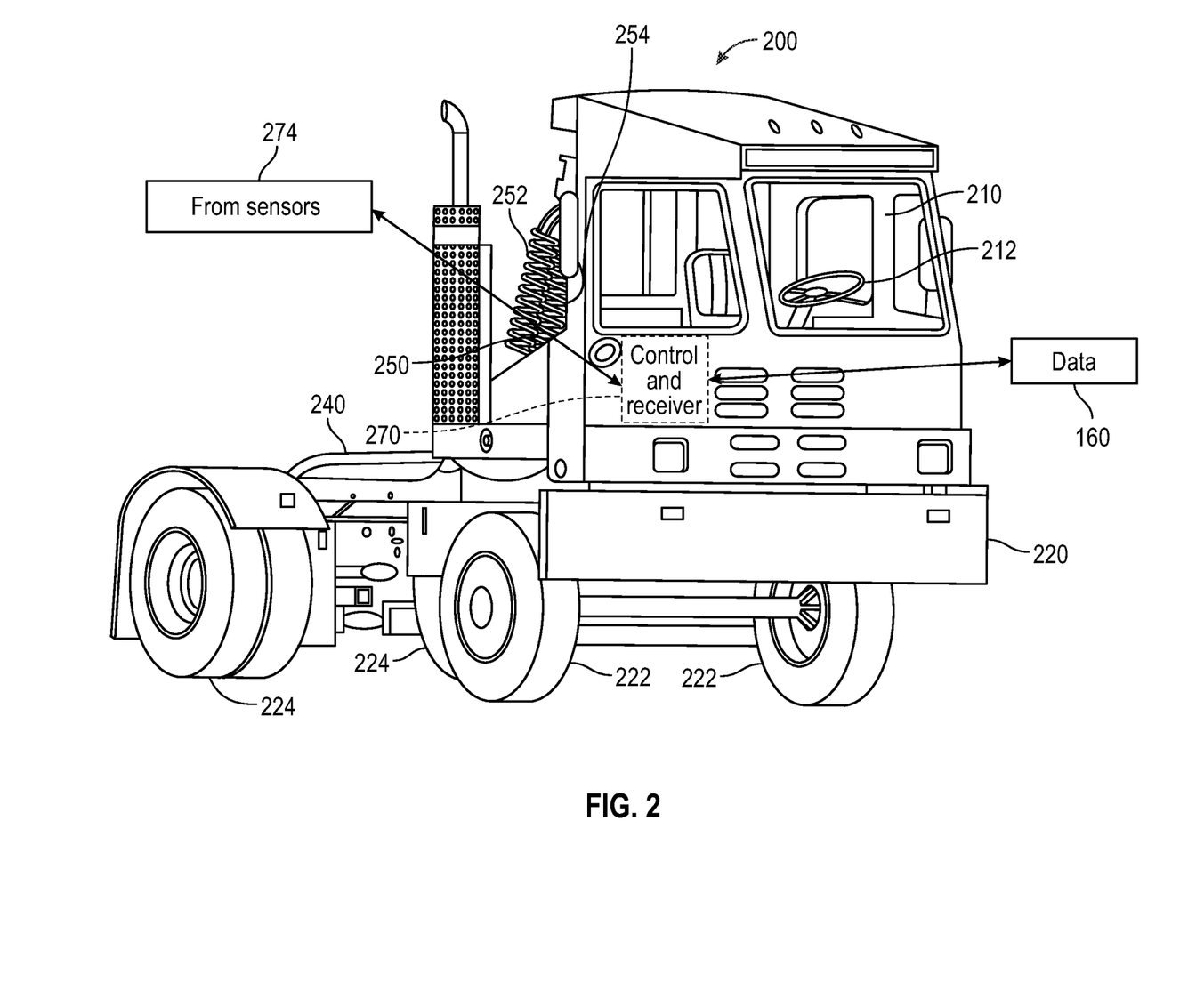
FIG. 2 is a perspective view of an exemplary fuel-powered AV yard truck for use in association with the system and method herein.
Figure 3:
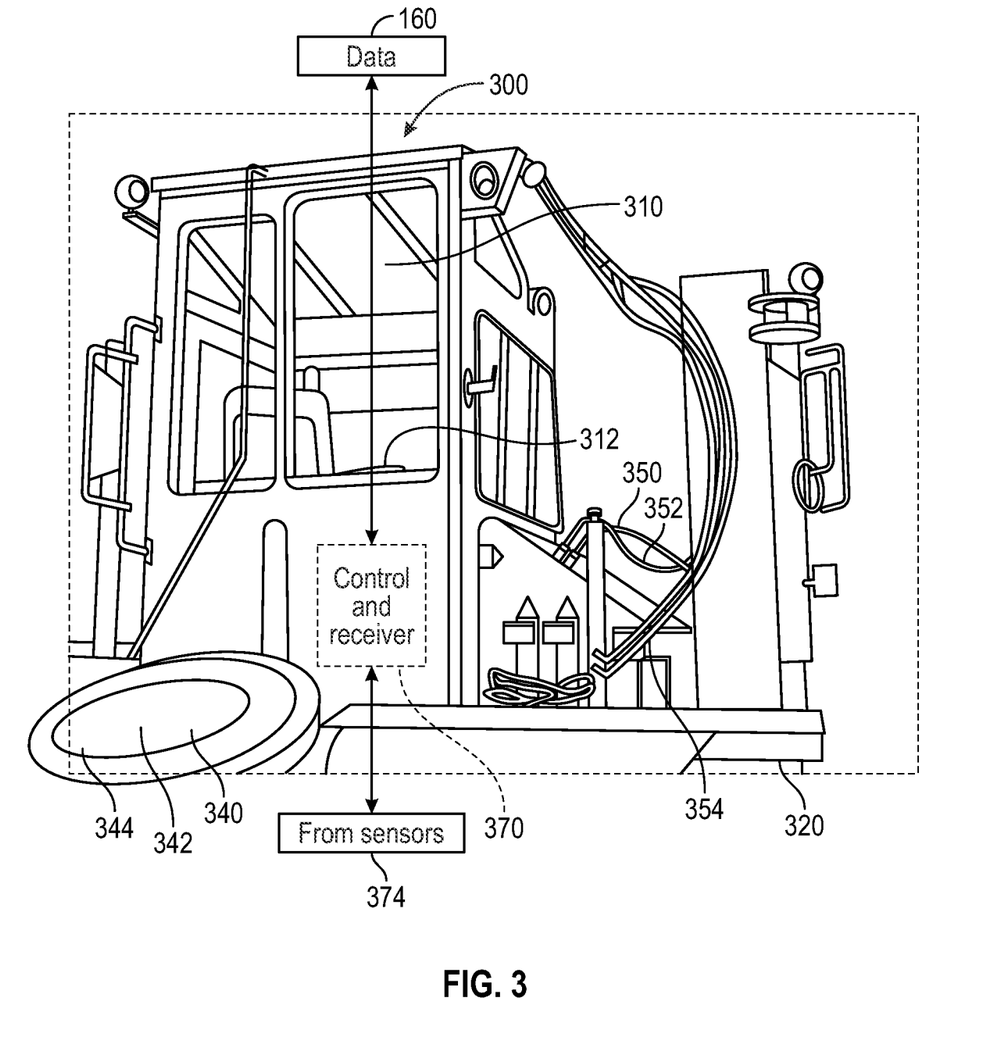
FIG. 3 is a rear-oriented perspective view of an exemplary electrically powered AV yard truck for use in association with the system and method herein, showing service connections (e.g. pneumatic braking and electrical) thereof.

Notably, the AV yard truck 200, 300 and 400 of FIGS. 2, 3 and 4, respectively, includes an emergency brake pneumatic hose 250, 350, 450 (typically red), service brake pneumatic hose 252, 352, 452 (typically blue) and an electrical line 254, 354, 454 (often black), that extend from the rear of the cab 210, 310, 410 and in this example, are suspended front the side thereof in a conventional (manually connected) arrangement. This allows for access by yard personnel when connecting and disconnecting the hoses/lines from a trailer during the maneuvers described above. The AV yard truck 200, 300, 400 includes a controller assembly 270, 370 and 470, respectively, shown as a dashed box. The controller 270, 370, 470 can reside at any acceptable location on the truck, or a variety of locations. The controller 270, 370, 470 interconnects with one or more sensors 274, 374, 474, respectively, that sense and measure the operating environment in the yard, and provides data 160 to and from the facility (e.g. the YMS, server 120 etc.) via a transceiver. Control of the truck 200, 300, 400 can be implemented in a self-contained manner, entirely within the controller 270, 370, 470 whereby the controller receives mission plans and decides on appropriate maneuvers (e.g. start, stop, turn accelerate, brake, move forward, reverse, etc.). Alternatively, control decisions/functions can be distributed between the controller and a remote-control computer—e.g. server 120, that computes control operations for the truck and transmits them back as data to be operated upon by the truck's local control system. In general, control of the truck's operation, based on a desired outcome, can be distributed appropriately between the local controller 270, 370, 470 and the facility system server 120.

II. Interchange Zone (IZ) Arrangement and Equipment

To further facilitate efficient, safe and orderly exchange of trailers between AV yard trucks and OTR trucks, the system and method herein provide one or more AV "Interchange Zone(s)" (IZ(s)). A primary function of the AV IZ is to ensure that AVs and Over-the-Road (OTR) vehicles are not interacting in the same environment, such as a distribution center, at the same time. The IZ can be considered as a vehicular 'airlock' that provides a neutral ground where OTR's and AV's are able to hand off trailers without (free of) occupying the area at the same time. Multiple OTRs can operate within the IZ at the same time, and multiple AVs can operate in the IZ at the same time (concurrently), but both OTR's and AV's cannot reside in the IZ at the same time (concurrently).

While the exact design of an IZ will vary by site, based upon layout of the facility (100) and/or other factors, some fundamental considerations can be common to all implementations. In the exemplary arrangement 500 of FIG. 5, a rectangularly shaped IZ 502 is shown. In the depicted, exemplary arrangement 500 there are three zones, an OTR only zone 504, the IZ 502 and an AV only zone 506). There are four (4) gates 510, 512, 520 and 522 that border this IZ 502 and control access from the respective zones 504 and 506. These four gates correspond to actions whereby: OTR trucks enter (510), OTR trucks exit (512), AV trucks enter (520), AV trucks exit (522). As shown, solid lines represent gates that are designated for AV only, while crossed (X) lines represent gates that are designated for OTR trucks only. Solid lines represent fencing, concrete, chains, or other type of physical barrier. This physical barrier prevents undesired/unsafe interaction with other unauthorized vehicles and persons.

Figure 5:
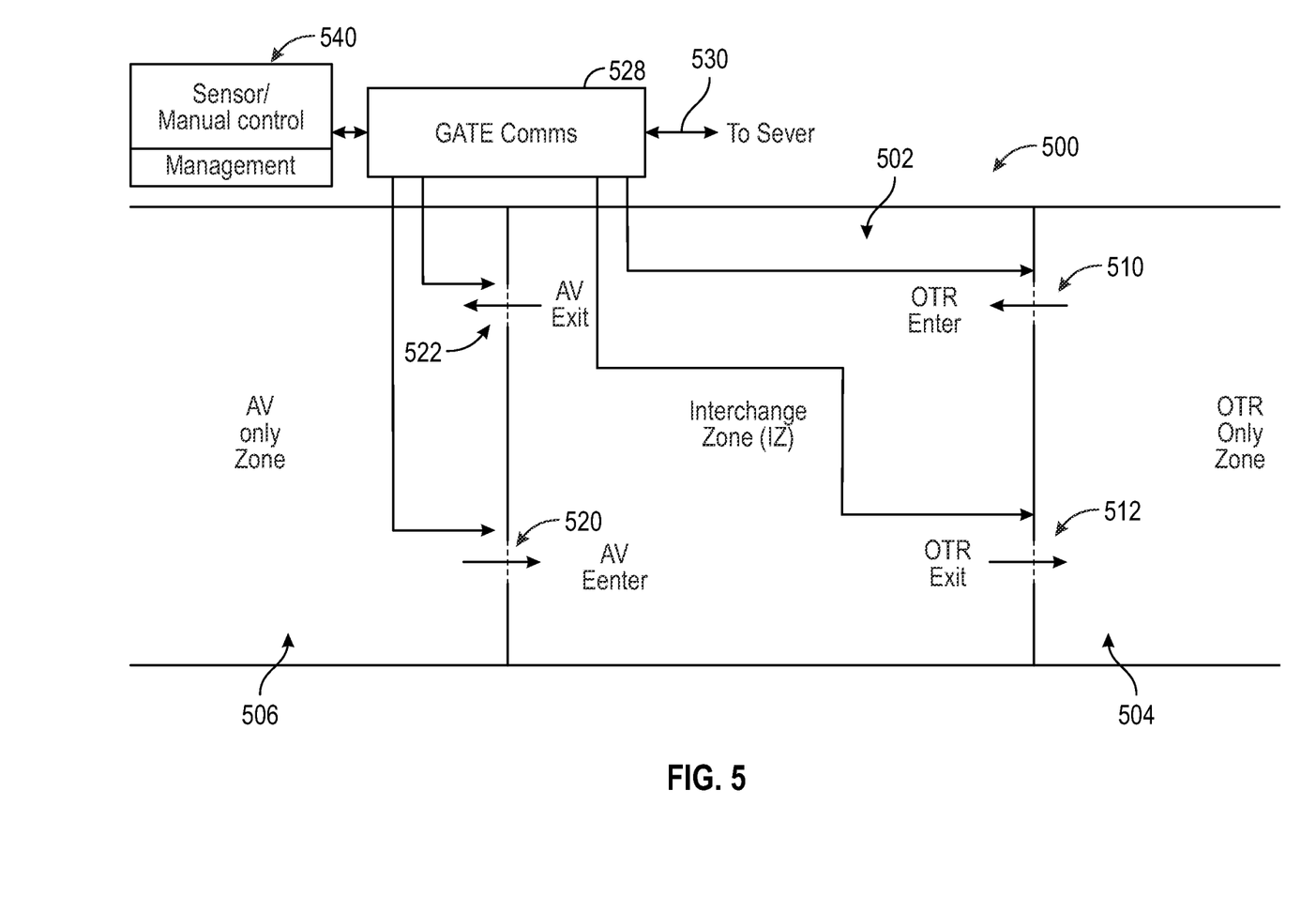
FIG. 5 is a schematic diagram showing an overhead/top view of generalized Interchange Zone (IZ) with associated gating and barriers for directing movement of AV and OTR trucks according to an illustrative embodiment.

Illustratively, all gates contain a gate communication system (GateComms) 528, which can be interfaced with the system server/control computer(s) 120 via appropriate wired or wireless links 530, and which that controls access and egress from the IZ 500. The gates 510, 512, 520 and 522 are opened and closed by either gate personnel via a gate control device (GCD), or by gate sensors and a software management system 540 that detects and maintains a vehicle count for OTRs and AVs. Notably, GateComms 528 communicate internally to ensure only AV or OTR gates are open at the same time, and count trucks entering and leaving the IZ 502 to ensure OTR's and AV's are not in the yard at the same time.

Note that the geometric layout of the IZ 502 as depicted in FIG. 5, places the OTR gates on the right with the OTR enter gate 510 on top and the OTR exit gate 512 on the bottom of the depiction, whilst the AV gates or located on the left with the AV enter gate 520 on the bottom and the AV exit gate 522 on the top of the depiction. This is exemplary of a wide variety of geometric IZ perimeter arrangements and layouts of gates—for example, on ovular or circular perimeter, and/or another regular or irregular polygonal perimeter shape.

Likewise, it is understood that the gates are sized and arranged to appropriately bar entry of vehicles and can be adapted to open and close using automated, semi-automated, or manual mechanisms that interface with appropriate sensors. For example, a series of sliding or swinging metal gates can be employed with sensors that report various states—such as "Open", "Closed", "Jammed", etc. Sensors can be directly connected to the gate mechanism, locks, and/or drive motors and/or can be provided at adjacent locations. Such gate-adjacent sensors can include optical, pressure and/or EM-based presence sensors that determine gate state and/or presence of a vehicle or person. Likewise, the various zones 502, 504 and 506 can include presence sensors within their environs that determine presence or absence of vehicles. Use and coordination of such sensors with the overall control system (e.g. the server 120, GateComms 528, etc.) is described in further detail below.

Protocols for emergency vehicle access can also be integrated into the GateComms system 528, wherein all gates are opened and AV activity will be immediately suspended until further commands are provided. Such protocols can be triggered by a vehicle-borne communication device (e.g. an IR or RF transmitter that is the same or similar to those used to trigger traffic signals), or another input—such as a facility alarm that is manually or automatically triggered.

GateComms 528 is responsible for reading the status of an IZ gate and transmitting that status. GateComms 528 is also responsible for commanding a gate to open or close based on input from an AV or from a gate control device. In operation, GateComms 528 sends a message with the status of its gate in response to a query from an AV, another gate, or the gate control device (GCD). This functionality is desirable to ensure that the AV does not enter the IZ at a time when over the road (OTR) trucks are also present inside of it. Gate-Comms 528 thereby commands a gate to open or close based on inputs sent from an AV or a GCD. In order to simplify the AV safety case an IZ will be created at each distribution center (DC). An IZ is a type of staging area for AVs and OTR trucks. It is critical to operational safety of the DC that AVs do not enter the IZ with OTR trucks present in it. The GCD is responsible for transmitting the gate position status to AVs, the GCD, and other Comms devices in a safety-critical manner. IZ gates are desirably commended to open and close remotely, and GateComms provides the capability to issue a demand signal to the gate's motor for it to open or close.

Figure 5A:
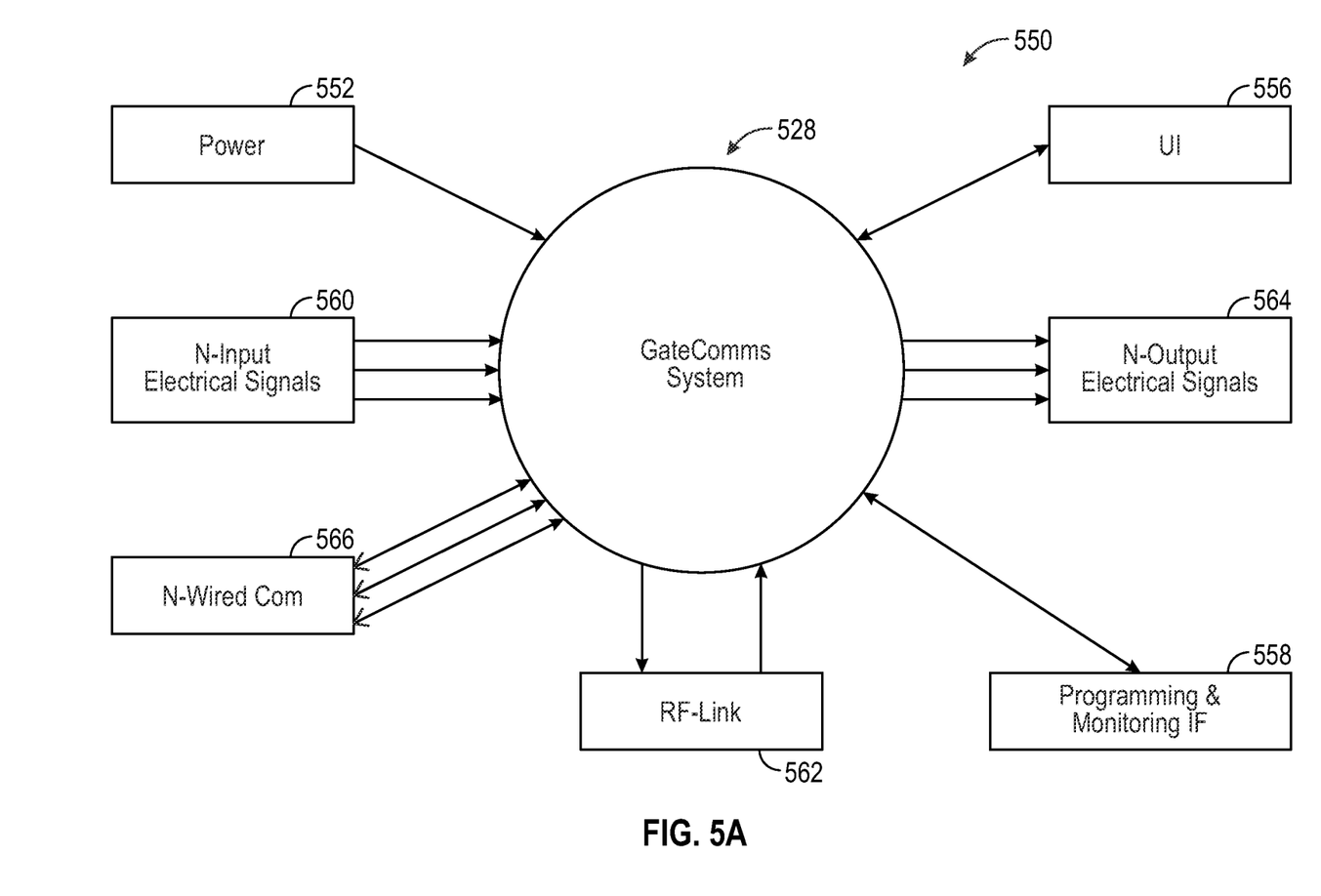
FIG. 5A is a block diagram showing a generalized arrangement of the GateComms system employed in association with the system and method herein, according to an illustrative embodiment.

With further reference to the diagram 550 of FIG. 5A, and by way of non-limiting example, a further description of the GateComms system 528 and associated interconnections/peripherals is provided. GateComms 528 can utilize parent hardware with additional programming and monitoring interfaces and functionalities 558 to relay the status of a gate to any device which queries it with a valid request via (e.g.) RF communications. Note that appropriate power (552) and user interface (556) connections are provided to Gate-Comms, sufficient to service the particular application/facility. These arrangements and their functionality should be clear to those of skill. Both RF (562) and wired (566) communications links are provided to GateComms 528 in this depicted example. GateComms 528 can also output a gate actuation command signal using a (e.g.) wired electrical signal (outputs 564). A primary use case of GateComms involves providing status of any of the IZ's gates to an AV outfitted with a Comms (for example, termed "Truck-Comms") device, or to the GCD. A secondary use case entails actuation of its gate. The input electrical signal(s) 560 from the gate status are mapped to the physical state of the gate. Input integrity checks will be performed and upon successful verification, the state will be transmitted via an RF-link 562. The safety functions of GateComms 528 include (e.g.) the following:

(a) Sensing and communicating when its gate is fully open;

(b) Sensing and communicating when its gate is fully closed; and/or (c) Counting the number of vehicles which have fully passed through the gate.

A plurality of use case-specific-operations is provided in the recited procedure below.

1. AV or Gate Control Device (Set Gate Position Actors)—Set Gate Position Use Case:

(a) AV or GCD (termed "setting devices" in this description) enters an area within RF range of N-number of gates. All of the gates are outfitted with GateComms. Other StarComms type devices may also be within range of RF communication and may receive all messages described below.

(b) Setting device sends a message over its RF link to a specific gate requesting it to open.

(c) The targeted gate's GateComms checks if it is safe to signal for this gate to open.

(d) The targeted GateComms sends a message indicating whether the gate open request will be honored.

(e) If the request will be honored, then GateComms signals to the gate operator for it open the gate.

(f) Setting device sends a message over its RF link to the gate requesting status.

(g) Gate operator opens gate, and once the gate is fully open, the targeted gate's GateComms responds to the setting device by issuing an open gate status response message over its RF link.

2. AV, Gate Control Device, or Mission Control (Get Gate Position Actors)—Get Gate Position Use Case:

(a) AV, GCD, or Mission Control requests the current gate position status of any gate within a DC with N-number of gates. All of the gates within the DC are outfitted with GateComms and communicate with the getting devices over RF communications.

(b) The targeted gate's GateComms checks the current gate status and responds with it by issuing a gate status response message over its RF link.

(c) Gate Control Device or other GateComms (Force Open Actors)—Force Open Use Case.

(d) GCD or other GateComms devices request that this GateComms' gate is forced open due to an emergency. This force open command is sent in the form of a message over the RF communications link of the GCD or any of the other GateComms devices within RF communication range.

(e) The targeted gate's GateComms immediately commands the gate guard to open its gate.

3. Other GateComms or Mission Control (Get Number of Trucks Actors)—Get Number of Trucks Use Case:

(a) Other GateComms devices or Mission Control request the number of trucks which have passed the gate of this GateComms device using RF communications.

(b) GateComms gets its number of trucks passed and sends this information in a response message over its RF link.

4. Mission Control or Site Technician (Get HW/SW Status Actors)—Get Historical Internal Status Use Case:

(a) Site technician or Mission Control establish a connection with a GateComms device over a programming/diagnostic interface.

(b) Site technician or Mission Control request contents of GateComms' memory allocated to recording historical status information.

(c) GateComms transmits the requested data.

4. Mission Control or Site Technician (Get HW/SW Status Actors)—Get Active Internal Status Use Case:

(a) Site technician or Mission Control establish a connection with a GateComms device over a programming/diagnostic interface.

(b) Site technician or Mission Control request output of Gate Comm's active status information.

(c) GateComms transmits the requested data.

5. Site Technician—Program System Use Case:

(a) Site technician establishes a connection with a Gate-Comms device over a programming/diagnostic interface.

(b) Site technician programs the connected GateComms device.

(c) Site technician verifies that programming process was completed successfully, and that the correct software was loaded.

6. Site Technician—Execute Self-Test Use Case:

(a) Site technician establishes a connection with a Gate-Comms device over a programming/diagnostic interface.

(b) Site technician calls the PerformSelfTest( ) method (c) GateComms executes the called method.

It should be clear that the steps employed by the above-described use-case examples can vary as appropriate for a particular set of circumstances and associated devices. Additional or alternate operational steps should be clear to those of skill and the hardware can be adapted to support such additional or alternate steps. Additionally, it is noted that various additional Comms arrangements can be employed in the overall facility and can interoperate (via, e.g. the server, communications systems, etc.) with the above-described GateComms system 528. For example, and as described operationally in the above-incorporated U.S. patent application Ser. No. 16/282,258 (and related applications thereto), loading dock operations can be handled by Dock-Comms. This functionality handles the movement of AV yard trucks and trailers into and out of loading dock in conjunction with associated visual (and other) sensors to ensure safety of the facility and personnel (among other goals) as such vehicles/trailers are backed into and/or exit the dock. Appropriate, interoperating Comms arrangements can also handle the opening and closing (and locking/unlocking) of trailer doors, lifting trailers, etc.

III. IZ Operational Procedure

A. AV Entry/Exit i. Initial Control System Assumptions

Figure 6:
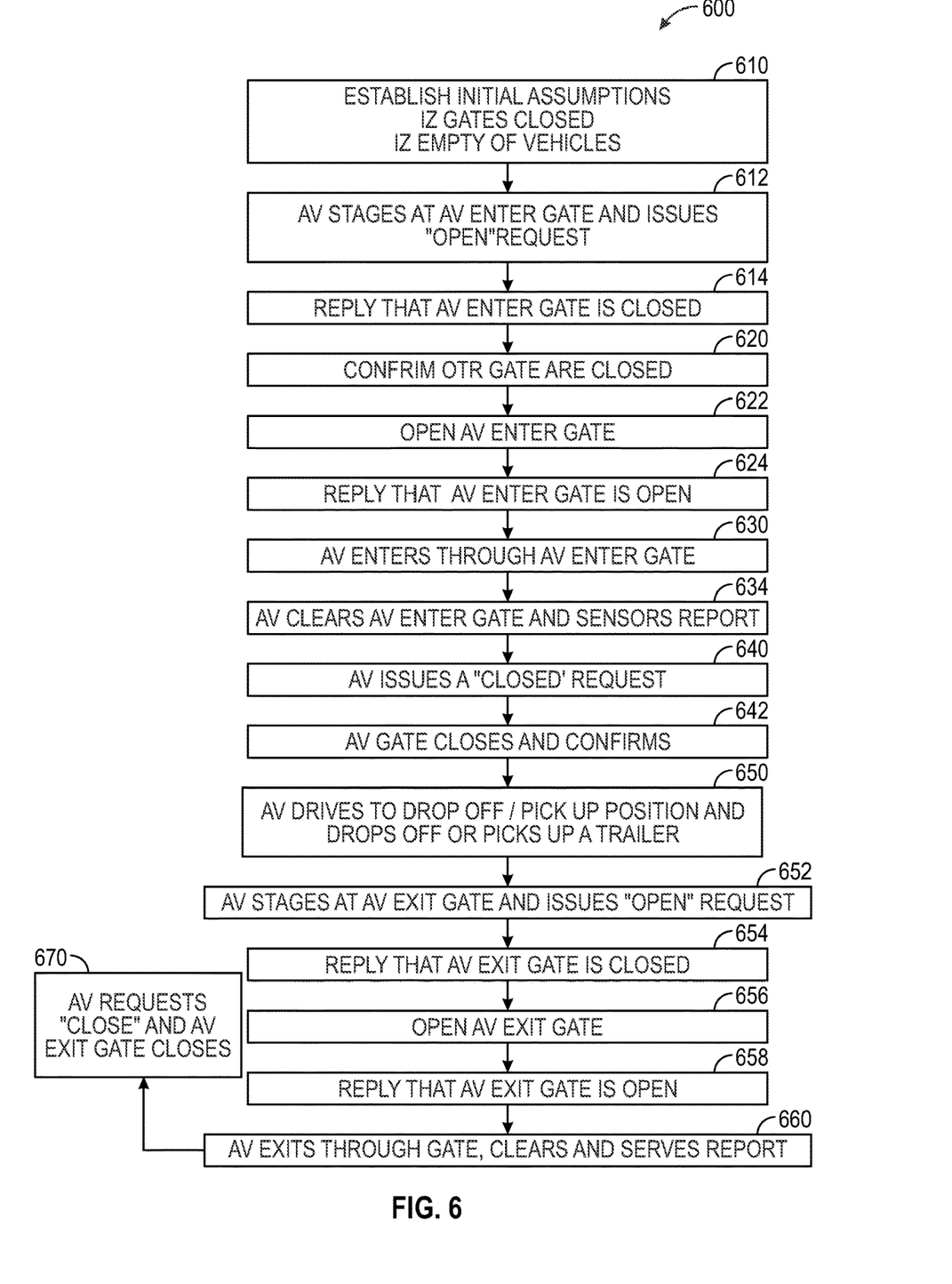
FIG. 6 is a flow diagram showing the generalized operation of an automated IZ as shown generally in FIG. 5 in enabling entrance, trailer dropoff/pickup and exit of an AV yard truck, as shown for example in FIGS. 2-4, according to an illustrative embodiment.

With further reference to the procedure diagram 600 of FIG. 6, to undertake automated IZ operation for entry and exit of AV yard trucks, it is assumed at the beginning of such IZ operation that all gates are closed and that no trucks currently reside in the IZ (step 610). At such time the AV can begin and entry and exit procedure to drop off or pick up a trailer contained within the IZ 502.

ii. AV Enters IZ for Dropoff or Pickup

Once initial assumptions have been provided/established relative to the automated control system, the AV stages at the AV enter gate 520 and AV issues an "Open" request signal relative to the AV enter gate (step 612). In response to the issued Open request, GateComms 528 replies that the AV enter gate is closed (step 614). The system controlling the AV enter gate 520 then confirms that OTR enter gate 510 and OTR exit gate 512 are closed in step 620. Upon confirmation, GateComms 528 then opens the AV enter gate 520 (step 622), and GateComms replies that the AV enter gate 520 is open (step 624). At this time, the staged AV enters the IZ 502 through the AV enter gate 520. Sensors detect and follow the entry and report to the control system as the AV clears the AV enter gate (step 634).

iii. AV Entry Into/Exit from IZ

Having cleared the AV enter gate 520, the AV issues a "Close" request signal to the control system (step 640). GateComms 528 then closes the AV enter gate 520 (step 642). Having entered the IZ 502, the AV proceeds to an appropriate dropoff/pickup position (located at one or more appropriate locations within the IZ 502), and drops or picks up a trailer (step 650). After completing the dropoff or pickup task, the AV then stages at the AV exit gate 522 and then issues an "Open" request signal for the control system relative to the AV exit gate (step 652). Thereafter, Gate-Comms 528 replies the AV exit gate is closed (step 654), and GateComms 528 then proceeds to open the AV exit gate (step 656). GateComms 528 then replies that the AV exit gate is open so that the AV can safely pass therethrough (step 658). Based upon an automated commend from the AV controller, the AV then exits the IZ 502 via the opened AV exit gate 522, clears the AV exit gate and reports closure (step 560). Once clear of the AV exit gate 522, the AV then issues a "Close" request signal to the control system with respect to the AV exit gate 522, and GateComms 528 closes the AV exit gate, confirming the closure through appropriate sensor signals (step 670)

B. OTR Truck Entry/Exit i. Initial Control System Assumptions

Figure 7:
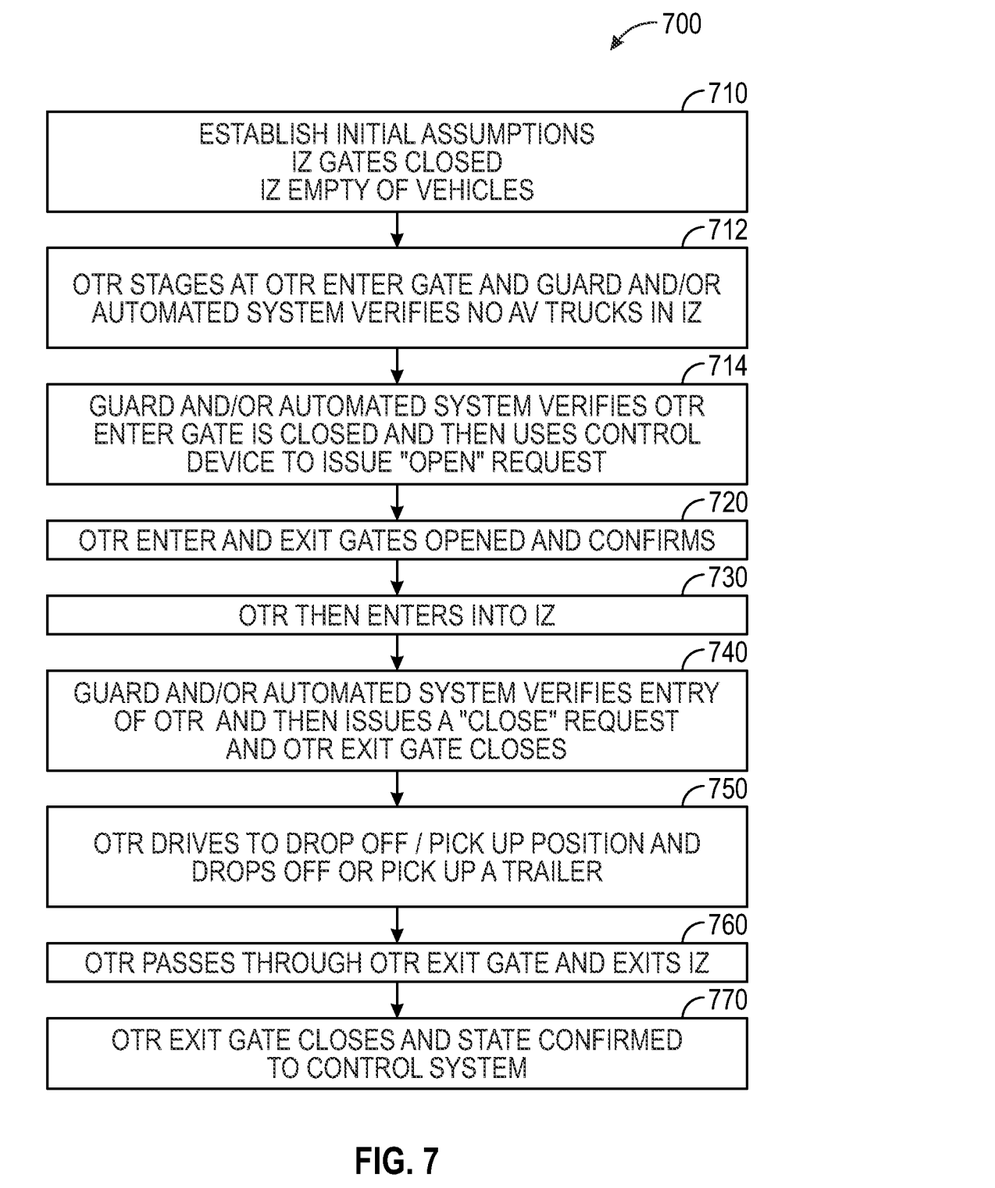
FIG. 7 is a flow diagram showing the generalized operation of an automated IZ as shown generally in FIG. 5 in enabling entrance, trailer dropoff/pickup and exit of an OTR truck, according to an illustrative embodiment.

With further reference to the procedure diagram 700 of FIG. 7, to undertake automated IZ operation for entry and exit of OTR trucks, it is again assumed at the beginning of such IZ operation that all gates are closed and that no trucks currently reside in the IZ (step 710). At such time, the OTR truck can begin and entry and exit procedure to drop off or pick up a trailer contained within the IZ 502.

ii. OTR Truck Entry Into/Exit from IZ

Once initial assumptions are established, then the OTR truck stages at the OTR enter gate 510 and a guard and/or an automated sensing system verifies that no AV trucks reside in the IZ presently (step 712). The guard and/or a sensing system then verifies that the AV gates are closed, and then uses a control device to issue an "Open" request signal with respect to the OTR enter gate (step 714). GateComms 528 then opens the OTR enter gate 510 and also opens the OTR exit gate 512 and this state is confirmed with the control system (step 720). The OTR truck then enters through the IZ in step 730. Once entry is confirmed by the guard and/or automated sensor, he and/or it uses control device to issue a "Close" request signal with respect to the OTR enter gate 510 (step 740). The OTR exit gate closes and this state is verified by the control system through manual and/or automated techniques. The OTR truck then proceeds to the dropoff/pickup position, and drops off or picks up a trailer at that appropriate location within the IZ in step 750. The OTR truck then exits the IZ 502 through the opened OTR exit gate 512 (step 760). After confirming that the OTR has cleared the gate 512 and IZ 502, the guard and/or automated sensing system then uses the control device to issue a "Close" request signal to the OTR exit gate 512, which closes the OTR exit gate. This state is confirmed via manual and/or automates sensing techniques (step 770).

IV. Additional Features and Considerations

Figure 8:
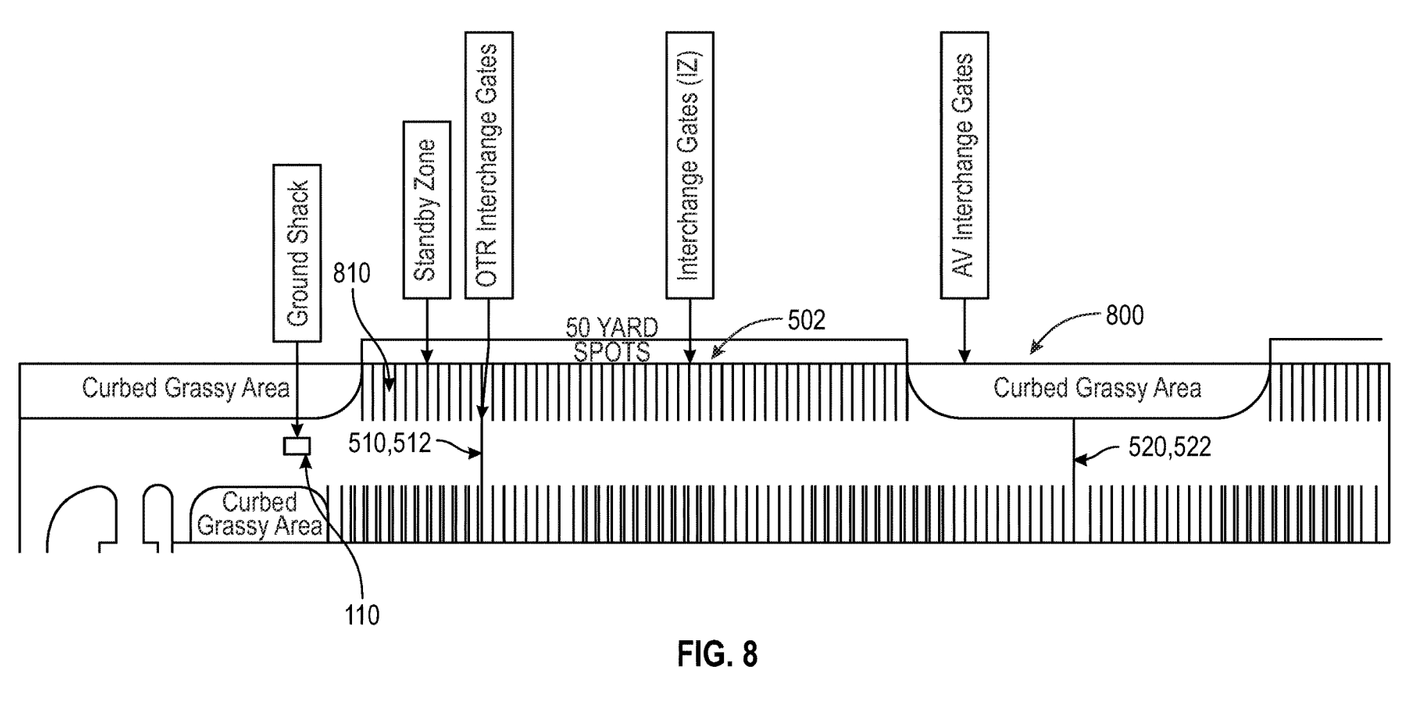
FIG. 8 is an overhead/top view of a portion of an exemplary facility including am IZ, associated OTR and AZ gates and a standby zone for waiting OTR trucks according to an illustrative embodiment.

In conjunction with the use of the IZ 502, it is also desirable to provide space for OTR's that must either wait for AV activity within an IZ before their inbound trailer can be dropped, or alternatively, await an AV to bring an outbound trailer to the IZ for OTR collection. This waiting area is referred to as a "standby zone", and allows for unobstructed flow to and from the check-in/check-out guard shack (110 in FIG. 1). The provision of a standby zone also benefits the facility (100), whereby inbound OTR's do not back up in a line beyond the facility entrance. An example of the standby zone 810, and other components of the AV yard (i.e., guard shack 110, IZ 502, OTR gates 510, 512, and AV gates 520, 522) described above, are shown in the generalized diagram of a facility 800 in FIG. 8. Note that the location, size and shape of the standby zone are highly variable, based upon size, traffic flow and geography of the facility. In general, the standby zone is located in a convenient place that allows flow of traffic to move readily from the gate to the IZ.

Another desirable component that provides enhanced functionality for the IZ is greater interconnectivity of the AV and overall facility. A custom software process(or), which can run on the server 120 or an interconnected computing resource, is responsible for not only communicating when it is safe for an AV or OTR to enter in interchange zone, but also for what trailer needs to be delivered where across the facility. In operation, inbound trailers are directed to specific docks or parking spots, and reloaded trailers can be staged or pre-staged, in or near the IZ, respectively, and dependent upon provided loadout times (e.g. according to a stored schedule). As a result, trailers are handled a minimum of times, and are also tracked in the software system for location within the yard and status of turn-around state. This tracking is possible as all AV's are equipped with vision scanning capabilities that log trailer number and distinguishing characteristics (see the above-incorporated U.S. patent application Ser. No. 16/282,258). In addition to trailer tracking, all AV's can also be equipped with transponders, and are continually mapped within the yard environment. This tracking also improves movement efficiencies, as tasks can be sorted to maximize hauling movements by location and minimize AV deadheading (movement without a trailer).

Another desirable feature that maximizes the efficiency of a facility is the data that is provided by the hauling companies. This data can include estimated OTR arrival times, both for dropping off trailers, as well as timing for picking up loaded trailers. This data in integrated into the yard management system and allows for both advanced knowledge of when to load a trailer at the dock, but also when a loaded trailer should be staged with the IZ, allowing for decreased turn-around times for OTRs. Note that the yard management system can optionally interface with tracking systems used by various OTRs so that arrival times can be more accurately mapped in the overall yard management system schedule.

Another desirable feature of the above-described data collection is that, by tracking all trailers and AV movements, along with knowing patterns of expected inbound OTR's, the software allows the system to calculate ideal "quiet" periods when the AV's can charge their battery systems throughout a 24 hour period (See also for background the above-referenced U.S. patent application Ser. No. 16/282, 258).

V. Conclusion

It should be clear that the use of a novel Interface Zone (IZ) within a facility that handles trailers in the presence of both OTR and AV yard trucks affords significant advantages in terms of safety, efficiency and general organization. Such IZs can be automated and interfaced with various tracking and management processes running on the yard management computing environment. Further features, such as a standby zone and tracking of OTR and AV trucks within the facility enhance the efficiency in trailer handling.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein the terms "process" and/or "processor" should be taken broadly to include a variety of electronic hardware and/or software based functions and components. Also, as used herein various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Accordingly, this description is meant to be taken only by way of example, and not to otherwise limit the scope of this invention.

What is claimed is:

1. A system for handling the interchange of trailers between an over the road (OTR) truck and an autonomous vehicle (AV) yard truck in a facility yard comprising:
   an interchange zone (IZ) that separates an OTR zone from an AV yard truck zone of the facility yard and is bounded by a predetermined boundary structure, having an OTR entry gate and an OTR exit gate on an OTR zone side and an AV entry gate and an AV exit gate on an AV yard truck zone side; and
   a management process that selectively opens and closes each of the OTR entry gate, the OTR exit gate, the AV entry gate and the AV exit gate according to a predetermined set of rules, wherein the management process includes a GateComms process that communicates with a plurality of AV gate controllers and other peripherals associated with the facility yard using RF and wired communications links, wherein the GateComms process is arranged to facilitate standard and emergency procedures associated with the facility yard, wherein the OTR entry gate, the OTR exit gate, and the AV exit gate are opened and closed by one or more of a gate personnel via a gate control device (GCD), a plurality of gate sensors and a software management system, wherein the OTR entry gate, the OTR exit gate, and the AV exit gate are opened and closed by one or more of a gate personnel via a gate control device (GCD), a plurality of gate sensors and a software management system, wherein the GateComms process counts the OTR trucks and the AV yard trucks entering and leaving the IZ to ensure the OTR trucks and the AV trucks are not in the IZ of the facility yard at a same time.

2. The system as set forth in claim 1 wherein the management process is arranged to determine whether the IZ is free of vehicles as an initial assumption in performing an interchange procedure.

3. The system as set forth in claim 2 wherein the management process is arranged to open the AV entry gate following the initial assumption and, after passage of the AV yard truck therethrough to close the AV entry gate.

4. The system as set forth in claim 3 wherein, after the passage of the AV yard truck and dropoff or pickup of a trailer thereby in the IZ, the management process is arranged to open the AV exit gate to allow passage of the AV yard truck therethrough.

5. The system as set forth in claim 2 wherein the management process is arranged to allow opening of at least one of the OTR entry gate and the OTR exit gate following the initial assumption and, after passage of the OTR truck therethrough, allow closing the OTR entry gate.

6. The system as set forth in claim 5 wherein, after the passage of the OTR truck and dropoff or pickup of a trailer thereby in the IZ, the management process is arranged to allow closing of the OTR exit gate after passage of the OTR truck therethrough.

7. The system as set forth in claim 1 wherein each of the OTR entry gate, the OTR exit gate, the AV entry gate and the AV exit gate include sensors that detect an open or closed state and report the state to the management process.

8. The system as set forth in claim 1 wherein the management process interacts with a controller for the AV yard truck to direct movement with respect to the IZ.

9. The system as set forth in claim 8 wherein the boundary structure restricts vehicle entry into the IZ except via the OTR entry gate, the OTR exit gate, the AV entry gate and the AV exit gate.

10. The system as set forth in claim 1 wherein at least one of the AV yard truck and the OTR truck include a tracking mechanism that interfaces with the management process to predict and manage arrival to and departure from the IZ.

11. The system as set forth in claim 1, further comprising a standby zone that allows for waiting of OTR trucks scheduled to enter the IZ, the standby zone located along a path of travel between an entrance of the facility and the IZ.

12. A method for handling the interchange of trailers between an over the road (OTR) truck and an autonomous vehicle (AV) yard truck in a facility yard comprising the steps of:
providing an interchange zone (IZ) that separates an OTR zone from an AV yard truck zone of the facility yard and is bounded by a predetermined boundary structure, having an OTR entry gate and an OTR exit gate on an OTR zone side and an AV entry gate and an AV exit gate on an AV yard truck zone side; and
selectively opening and closing each of the OTR entry gate, the OTR exit gate, the AV entry gate and the AV exit gate according to a predetermined set of rules; and
communicating, by a GateComms process, with a plurality of AV gate controllers and other peripherals associated with the facility yard using RF and wired communications links, wherein the GateComms process is arranged to facilitate standard and emergency procedures associated with the facility yard, wherein the OTR entry gate, the OTR exit gate, and the AV exit gate are opened and closed by one or more of a gate personnel via a gate control device (GCD), a plurality of gate sensors and a software management system, wherein the OTR entry gate, the OTR exit gate, and the AV exit gate are opened and closed by one or more of a gate personnel via a gate control device (GCD), a plurality of gate sensors and a software management system, wherein the GateComms process counts the OTR trucks and the AV yard trucks entering and leaving the IZ to ensure the OTR trucks and the AV trucks are not in the IZ of the facility yard at a same time.

13. The method as set forth in claim 12, further comprising, providing a standby zone that allows for waiting of OTR trucks scheduled to enter the IZ, the standby zone located along a path of travel between an entrance of the facility and the IZ.

14. The method as set forth in claim 12, further comprising, determining whether the IZ is free of vehicles as an initial assumption in performing an interchange procedure.

15. The method as set forth in claim 14, further comprising, opening the AV entry gate following the initial assumption and, after passage of the AV yard truck therethrough, closing the AV entry gate.

16. The method as set forth in claim 15, further comprising, after the passage of the AV yard truck and dropoff or pickup of a trailer, opening the AV exit gate to allow passage of the AV yard truck therethrough.

17. The method as set forth in claim 13, further comprising, opening of at least one of the OTR entry gate and the OTR exit gate following the initial assumption and, after passage of the OTR truck therethrough, closing the OTR entry gate.

18. The method as set forth in claim 17, further comprising, after the passage of the OTR truck and dropoff or pickup of a trailer thereby in the IZ, closing of the OTR exit gate after passage of the OTR truck therethrough.

* * * * *